Fig. 2.

Feb. 20, 1951  M. J. RELIS  2,542,057
METHOD AND APPARATUS FOR MEASURING
THE CONDUCTIVITY OF AN ELECTROLYTE
Filed May 6, 1948  4 Sheets-Sheet 4

Inventor
M. J. Relis

By
M. C. Hayes
Attorney

Patented Feb. 20, 1951

2,542,057

UNITED STATES PATENT OFFICE 2,542,057

METHOD AND APPARATUS FOR MEASURING THE CONDUCTIVITY OF AN ELECTROLYTE

Matthew J. Relis, Washington, D. C.

Application May 6, 1948, Serial No. 25,444

15 Claims. (Cl. 175—183)

(Granted under the act of March 3, 1883, as amended April 30, 1928; 370 O. G. 757)

This invention relates to a method and apparatus for measuring the conductivity of a conducting medium without the use of electrodes. More specifically, the invention includes an arrangement in which a toroidal pickup coil is employed to measure the conductivity of the electrolyte by measuring the flow of an electrical current set up within the electrolyte by a toroidal driver coil disposed within the electrolyte in spaced and coaxial relation therewith when an alternating current is applied to the driver coil and when the effect of the stray field of the driver coil upon the pickup coil is eliminated.

Devices and systems for measuring the conductivity of an electrolyte which have been heretofore proposed employ two spaced electrodes or a pair of coils, as the case may be, immersed within the electrolyte for measuring the conductance of the electrolyte. Such devices have not been altogether satisfactory under the conditions of service by reason of certain detrimental characteristics which are inherent in the system employing these devices. In the case of the spaced electrodes, for example, the degree of accuracy of results obtained is adversely effected by reason of the polarization of the electrodes while in use. Attempts to minimize this error by the use of alternating current have been made and it has been found that the frequency of alternation of the energizing current improves the accuracy of the final results. However, there is often an error present due to mineral deposits on the electrodes which impairs their efficiency and introduces additional resistance in the measuring circuit. There is also a similar error in measuring conductivity of liquids in cases in which there is relative motion between the liquid and the electrodes by reason of the cavitation of the liquid around the electrode surfaces.

In the systems employing a pair of toroidal coils which have heretofore been proposed an error in the final result is present by reason of the coupling between the coils caused by the stray magnetic or electric fields from the driver coil causing a spurious voltage to be generated in the pickup coil generally in out-of-phase relation with respect to the voltage generated in the pickup coil by the flux set up by alternating current within the electrolyte. Such a system, for example, is disclosed in a report of April 24, 1920 of the Swiss Physical Society in "Archives des Sciences Physiques et Naturelles" Series 5, vol. 2, pp. 264–265, describing a demonstration of measuring the conductivity of an electrolyte by generating currents of electricity within an electrolyte without electrodes which was carried on by Piccard and Frivold.

The present invention possesses all of the advantages of the prior art devices and none of the foregoing disadvantages. In accordance with the present invention, the measurement of the conductivity of the conducting medium or electrolyte is obtained by employing two insulated coils with toroidal cores arranged in coaxial and predetermined spaced relation and immersed within an electrolyte in which an alternating current is caused to flow through the conducting path linking one of the coils, hereinafter referred to as a pickup coil, in response to an alternating field set up by the other coil, hereinafter called a driving coil, when an alternating power source is applied thereto. The alternating current within the electrolyte sets up an alternating field in the core of the pickup coil which causes a voltage to be generated therein in proportion to the conductivity of the electrolyte. In the case of the driver coil, however, not all of the flux of the coil is disposed within the core thereof and a small portion of this flux, hereinafter termed leakage or stray field, intercepts the winding and core of the pickup coil causing a spurious or residual voltage to be generated therein, usually in out-of-phase relation with respect to the voltage in the pickup coil generated by the alternating current within the electrolyte. A further spurious voltage is caused by capacitive coupling between the two coils. These spurious voltages are nulled by a voltage injecting network supplying a voltage of adjustable phase and magnitude to the pickup circuit whereby only the voltage generated by the alternating current within the electrolyte is measured as an indication of the conductivity of the electrolyte.

The present invention is suitable for use with either a direct reading or a nulling type of system. When used with the nulling type of system the setting of the nulling device is employed as a measure of conductivity of the electrolyte.

The subject invention is well adapted for a variety of uses and is particularly adapted for use in salinity surveys to determine the salinity gradient in the vicinity of polar ice and river estuaries. The invention may also be applied advantageously in measuring the conductivity of water in salinity-indicating systems of power plants, or of electrolytes in chemical processes. The apparatus may be applied to the measurement of conductivity of oils, muds, sands, sludges and the like. A further application of the apparatus to measuring the conductivity of molten metals may be accomplished by merely making the components of the toroid assembly of refractory materials.

One of the objects of the invention is to provide a new and improved method of measuring the electrical conductivity of an electrolyte without using electrodes.

Another object of the invention is to provide a new and improved method of accurately measuring conductivity of an electrolyte without using electrodes in which the error caused by the voltage in the pickup coil resulting from the stray magnetic and electric fields of the driver coil is eliminated.

Another object of the invention is to provide new and improved apparatus for measuring the conductivity of an electrolyte which utilizes a driver coil to induce an electrical current in an electrolyte and a pickup coil which is energized by the stray magnetic and electric fields of the driver coil as well as by the current flowing in the electrolyte and in which the error caused by the stray fields on the pickup coil is eliminated.

Another object of the invention is to provide a new and improved apparatus for measuring the conductivity of an electrolyte without electrodes in which the conductivity is obtained by direct reading of the voltage induced in a pickup coil by a flow of current in the electrolyte.

A further object of the invention is to provide a new and improved electrodeless apparatus for obtaining a reading of the voltage employed to null the voltage induced in a pickup coil by a flow of current in the electrolyte as an indication of the conductivity of the electrolyte.

A further object of the invention is to provide a new and improved apparatus for measuring the electrical conductivity of an electrolyte in which any voltage in the pickup coil due to stray field from the driver coil will be bucked out by an adjustable voltage from a phase shifting circuit included in the pickup circuit.

A still further object of the invention is to provide a new and improved null type apparatus for measuring the electrical conductivity of an electrolyte including a phase shifting circuit to buck out any voltage in the pickup coil due to inductive and capacitive coupling between driver and pickup coils.

Other objects and advantages not hereinbefore set forth will be apparent after a consideration of the specification taken in connection with the accompanying drawings, in which.

Figure 1:
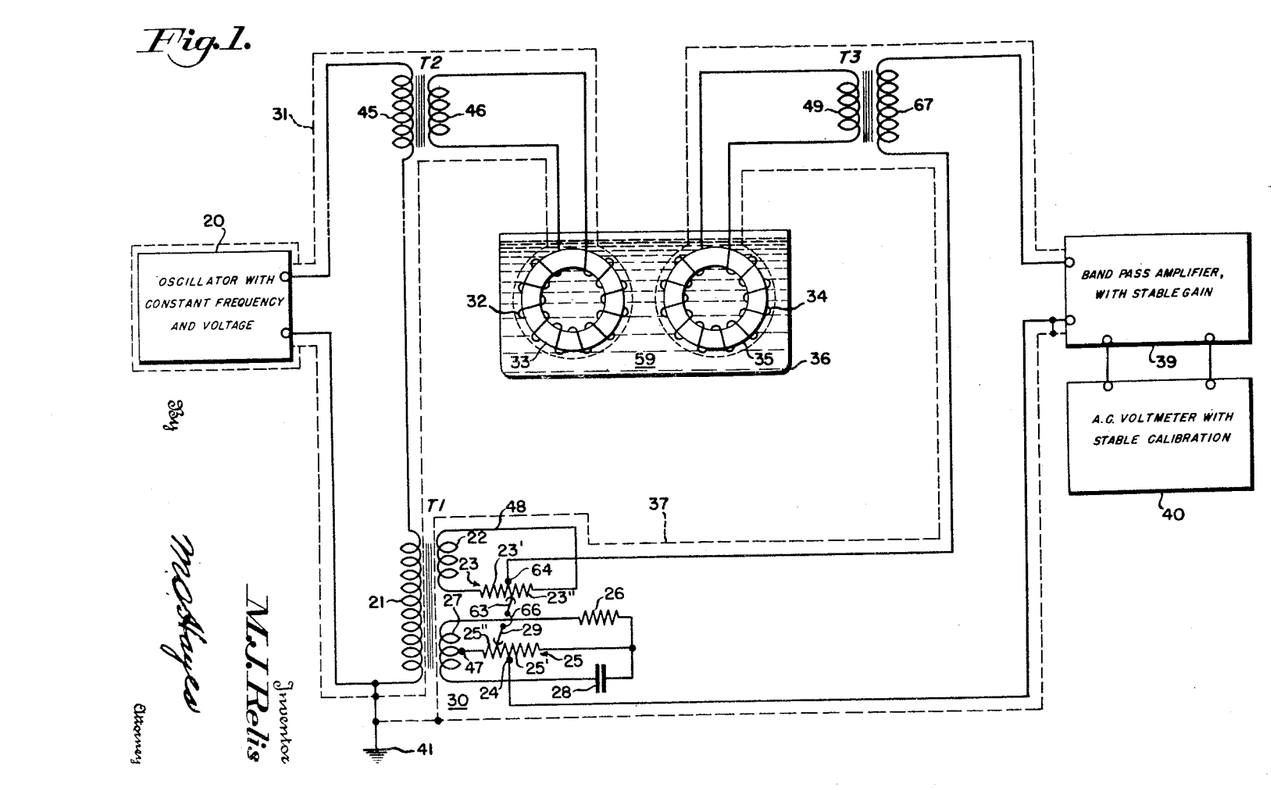
Fig. 1 is a diagrammatic view of an embodiment of the invention suitable for furnishing a direct reading.

Referring now to the accompanying drawings in which like numerals of reference are employed to designate like parts, and more particularly to Fig. 1 thereof, there is shown thereon an oscillator with constant frequency and voltage designated by reference character 20. Across the oscillator, windings 21 and 45 are connected in series, winding 21 being the primary winding of transformer $T_1$ used in the compensating circuit, indicated generally by 30, and winding 45 being the primary winding of transformer $T_2$. The secondary winding 27 of transformer $T_1$ is connected in series with resistance 26 and condenser 28 of circuit 30. Resistance element 25' of potentiometer 25 is connected to the junction of resistance 26 and condenser 28. The other resistance element 25" of potentiometer 25 is connected to the center tap 47 of winding 27 of the transformer $T_1$.

Potentiometer 25 is center tapped at 24 and connected in series with the input to the band pass amplifier 38.

The input to amplifier 38 is connected in series with secondary winding 67 of transformer $T_3$. Winding 67 of transformer $T_3$ is also connected to the center tap 64 of potentiometer 23 of the voltage injector circuit 48. Circuit 48 includes secondary winding 22 of transformer $T_1$ and potentiometer 23 connected together. Slider 63 operates in conjunction with resistance elements 23' and 23" on opposite sides of the center tap 64 of potentiometer 23. Sliders 63 and 29 are connected together by lead 66 and slider 29 operates in conjunction with potentiometer 25.

Secondary winding 46 of transformer $T_2$ is connected across the coil 32 of driver toroidal core 33 in toroid assembly 59.

The primary winding 49 of transformer $T_3$ is connected across pickup coil 34 of pickup toroidal core 35 in toroid assembly 59.

The driver circuit is shielded by a shield 31 and the pickup circuit is shielded by a shield 37, both shields being grounded at 41.

The transformers $T_2$ and $T_3$ match the high-impedance oscillator and amplifier to low-impedance toroids and are used to permit the use of long cables to the driver and pickup toroids and thereby avoid influencing the toroidal coils by the capacity resulting from these long cables. It is to be understood that in certain applications where short cables are practical, the transformers may be eliminated and high-impedance toroids may be used.

The band-pass amplifier is the type that has stable gain so that the voltage indicated by A. C. voltmeter 40 is always a true indication of the voltage obtained from pickup circuit. The upper cut-off frequency of the band-pass amplifier is higher than the frequency of the oscillator but well below the second harmonic thereof to eliminate errors due to harmonic voltages in the pickup coil. The lower cut-off frequency should preferably be above the third harmonic of the line voltage to eliminate errors due to power line coupling to the toroids or through the power supply if the power supply is line operated.

The A. C. voltmeter 40 connected across the terminals of amplifier 38 is preferably of the type that has stable calibration in order that errors due to a change in calibration may be held to a minimum.

Figure 2:
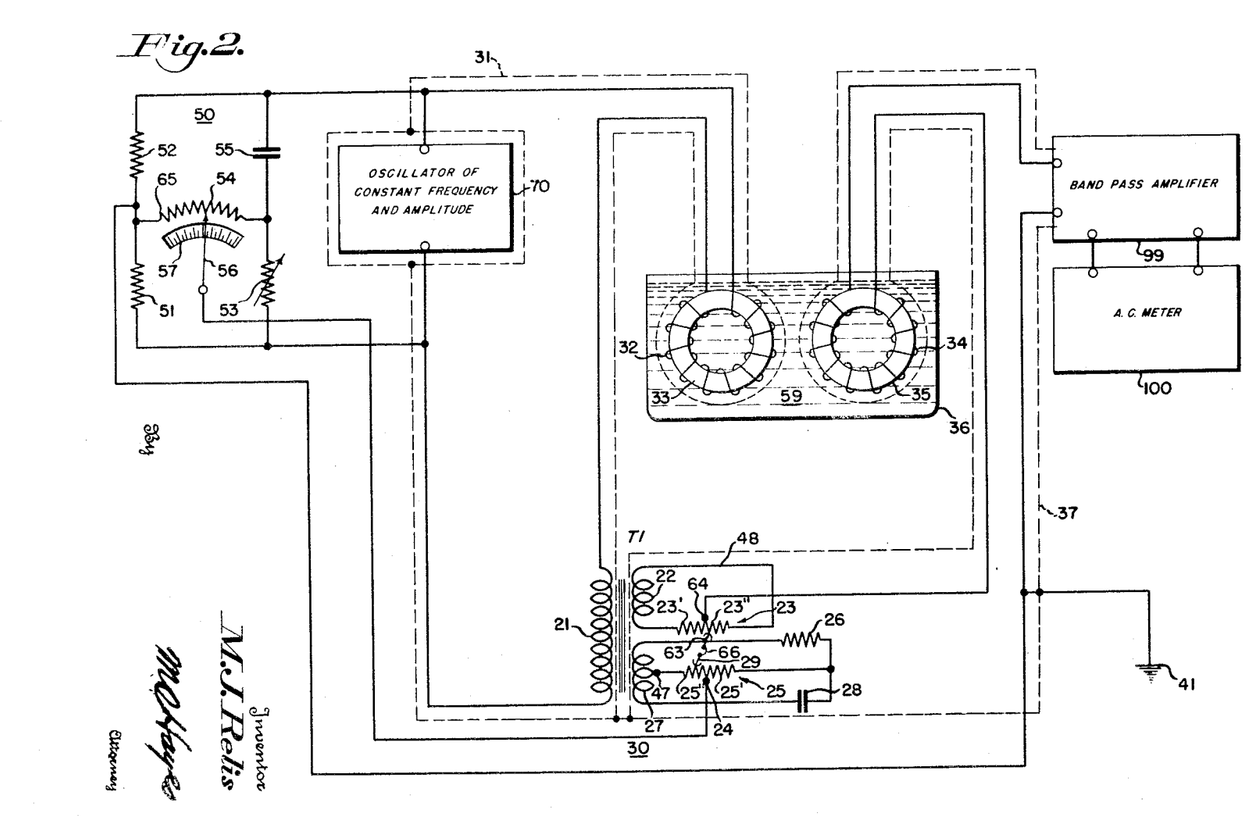
Fig. 2 is a diagrammatic view of a preferred embodiment of the invention suitable for furnishing a null reading.
Figure 3:
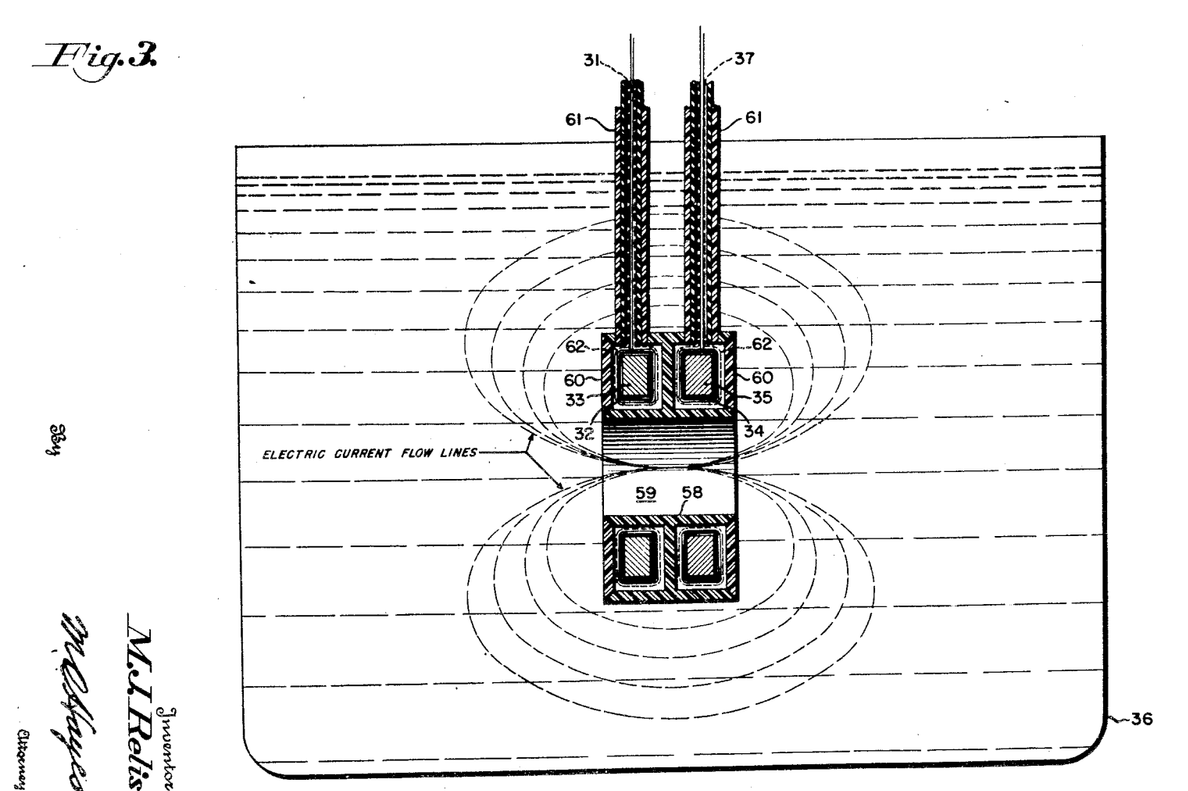
Fig. 3 is a sectional view of the toroid assembly of driver and pickup coils.

Reference is now made to Fig. 3 which is a sectional view of one form of the toroid assembly 59. Although Figs. 1 and 2 illustrate the toroids in noncoaxial positions, this is merely for the purpose of description and it should be understood that the preferred arrangement is shown by Fig. 3 in which the coils are arranged in coaxial relation. Driver toroidal core 33 and pickup toroidal core 35 may be composed of any ferromagnetic material suitable for the purpose such, for example as molybdenum permalloy dust, a well known material of high magnetic stability. Non-magnetic cores may also be used. The windings of the driver and pickup coils, 32 and 34 respectively, are composed of heavily insulated copper wire. The coils are shielded by thin copper shields 62 which are split so as not to act as short-circuited turns. The toroids, coils and shields are mounted in a waterproof insulated casing 58. The end caps 60 of the casing are also of waterproof insulating material and are cemented in the casing 58. Insulating tubes 61 are employed as waterproof conduits for the leads to the pickup and driver toroid coils. Tubes 61 are cemented into casing 58. The leads to the driver and pickup toroids are shielded with coaxial tubing. Shields 62 are connected to shielding tubes 31 and 37 respectively which are grounded at the oscillator to reduce the capacitive coupling between the driver and pickup circuits. The capacitive coupling, however, may still be of sufficient magnitude to cause appreciable voltage errors. Compensating circuit 30 is used to reduce these errors to an insignificant quantity.

In order that the spurious effects on the pickup coil resulting from the stray magnetic field of the driver coil on the pickup coil may be at a minimum, toroids are used as cores for the driver and pickup coils since uniformly wound toroidal coils have substantially no external or leakage magnetic field, provided the coil is wound according to common telephone practice in which the single-turn circular loop, which results when a uniform winding is wound progressively either in a clockwise or counterclockwise direction along the toroidal core, is cancelled by a return loop in the opposite direction. However, it has been determined experimentally that an appreciable inductive coupling still remains between the toroid coils due to non-uniformity of the windings and inhomogeneity of the toroid cones. The remaining flux field of the driver toroid coil acts similarly to the field of an imaginary dipole positioned in a plane normal to the toroid axis. The pickup toroid behaves similarly to a small imaginary coil with its axis also positioned in a plane normal to the axis of the toroids and in a random direction with respect to the axis of the dipole. By rotating the axis of the dipole with respect to the axis of the core until the two axes are at right angles, the coupling between them is minimized. This condition may be reached by rotating one toroid with respect to the other until the voltage induced in the pickup coil is at a minimum. The inductive coupling, however, may still be of sufficient magnitude to cause appreciable errors. Compensating circuit 30 is used to reduce this voltage to an insignificant quantity.

The part of circuit 30 including secondary coil 22 and center tapped resistance 23 forms a resistance circuit which has a voltage developed across the resistance in phase with the secondary voltage of transformer T1. The voltage between center tap 64 and slider 63, however, will be either in phase with the voltage in the secondary of transformer T1 or 180° out of phase with this voltage depending on whether slider 63 makes contact with resistance element 23' or 23'' of resistance 23. The magnitude of this voltage, of course, depends on the deviation of slider 63 from center tap 64.

The part of circuit 30 including secondary 27, resistance 26, condenser 28 and center tapped resistance 25 forms a bridge circuit that shifts the voltage across resistance 25 with respect to the voltage of the secondary winding 27 by a predetermined amount such, for example, as 90°. Thus, the voltage between the center tap 24 and the slider 29 will either lead or lag the secondary voltage of transformer T1 by 90° depending on whether slider 29 contacts resistance element 25' or 25'' of resistance 25. The magnitude of this voltage depends on the deviation of slider 29 from center tap 24. Although the operation of the bridge circuit has been described on the basis of causing a 90° phase shift therein it should be understood that a 90° phase shift is only preferred for obtaining greatest ease of adjustment and other phase shifts of the voltage in the bridge circuit will give satisfactory results.

Figure 4:
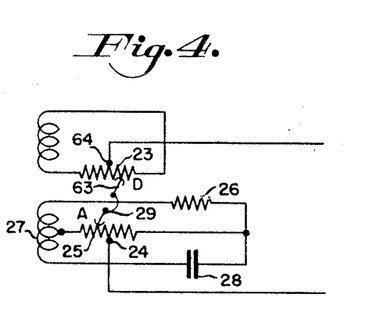
Fig. 4 is a circuit of the phase shifting and voltage injecting elements in which the adjustable means are set to give a leading voltage.
Figure 5:
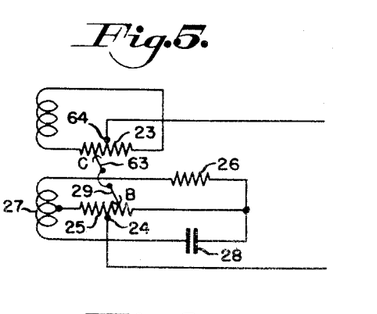
Fig. 5 is a circuit similar to Fig. 4 in which adjustable means are set to give a lagging voltage.
Figure 6:
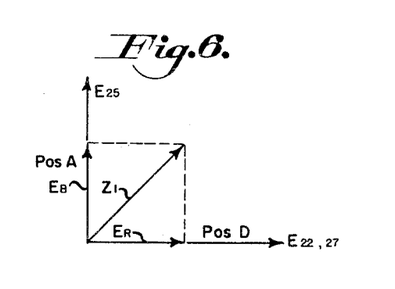
Figs. 6 and 7 are vector diagrams respectively corresponding to the circuits shown on Figs. 4 and 5.
Figure 7:
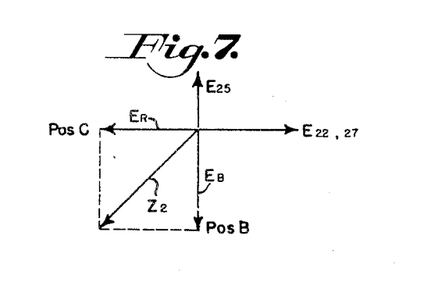

In Fig. 6 the voltage vector $E_r$ representing the voltage of the resistance circuit between center tap 64 and slider 63 is in phase with the voltage vector $E_{22, 27}$ representing the voltage of the transformer secondary coils 22 or 27 whereas in Fig. 7 the voltage $E_r$ is 180° out of phase with the voltage vector $E_{22, 27}$. The change is caused by shifting the slider 63 from position D, Fig. 4, to position C, Fig. 5. Also in Fig. 6 the vector $E_b$ in phase with the voltage $E_{25}$ across resistance 25 and representing the voltage of the bridge circuit between center tap 34 and slider 29 lags the voltage vector $E_{22, 27}$ whereas in Fig. 7 the voltage $E_b$ leads the voltage vector $E_{22, 27}$. This change is caused by shifting the slider 29 from position A, Fig. 4, to position B, Fig. 5. As shown on Figs. 6 and 7 the voltage vectors $E_r$ and $E_b$ form resultant vectors $Z_1$ and $Z_2$ in two different quadrants. It follows that by proper positioning of sliders 29 and 63 two voltages 90 degrees apart in phase may be used to form a resultant vector in any quadrant of the circle. The residual voltage in pickup coil 34 caused by inductive and capacitive coupling between the driver and pickup coils will be compensated when the resultant vector obtained from circuit 30 is in phase opposition and equal in magnitude to that of the residual voltage.

Before operating the device shown on Fig. 1 to measure conductivity it is necessary to null any residual voltage in pickup coil 34 due to inductive and capacitive coupling between the driver and pick up coils. This is accomplished before positioning toroid assembly 59 in the electrolyte. At this time voltmeter 40 should indicate only the value of the residual voltage in toroid coil 34. Sliders 29 and 63 are now positioned until a zero reading is obtained on voltmeter 40. After a zero reading has been obtained on voltmeter 40 the system is ready for measuring the conductivity of the electrolyte. Toroid assembly 59 is now immersed in the electrolyte.

Coil 32 is energized by transformer T2. The energized coil sets up an alternating magnetic flux that is confined substantially to driver toroid 33. Therefore, the flux in the driver toroid follows a toroidal path encircling the electrolyte within the hole of the toroid. The flux in the toroidal path induces a voltage in the electrolyte which causes a current of electricity to flow through the electrolyte in the hole in driver toroid 33. Thus, the electrolyte becomes the secondary of a transformer, of which driver coil 32 is the primary. The current of electricity flowing through the electrolyte in the hole of driver toroid 33 also flows through the electrolyte in the hole of pickup toroid 35; refer to the current flow lines illustrated by Fig. 3. The current flowing in the electrolyte induces a magnetic flux in toroid 35. The flux induced in toroid 35, induces a voltage in pickup toroid coil 34 which causes a current to flow in coil 34 and primary 49 of transformer T₃. The current flowing in primary winding 49 causes a voltage to be induced in secondary winding 67 of transformer T₃. The voltage in secondary winding 67 is given constant amplification by amplifier 39. A. C. voltmeter 40 connected across amplifier 39 measures the voltage across the output terminals of the amplifier. Voltmeter 40 is calibrated to read directly in terms of conductivity of the electrolyte.

Reference is made to Fig. 2 in which there is shown a null-type conductivity measuring system in which compensating circuit 30 and toroid assembly 59 are similar to a like numbered circuit and assembly of Fig. 1. Across oscillator 70 there is connected in series, driver toroid 32 and primary 21 of transformer T₁ energizing compensating circuit 30. Also connected across the oscillator 70 is the bridge circuit 50. The four arms of the bridge including the fixed resistances 51 and 52, variable resistance 53 and condenser 55. The galvanometer circuit of bridge 50 comprises resistance 54 connected at one end to the junction of condenser 55 and variable resistance 53, and at the other end of the junction of fixed resistances 51, 52. Slider 56 coacts with resistance 54. Slider 56 is connected in series with the compensating circuit 30, pickup toroid coil 34, band pass amplifier 99 and resistance 54. The scale 57 is mounted in adjacent operative relation to the slider 56 so that the two can be employed to give a reading.

A. C. voltmeter 100 is connected across the terminals of the band pass amplifier 99.

In setting up the system shown by Fig. 2 for measuring the conductivity of an electrolyte it is necessary to null any residual voltage in pickup coil 34 due to inductive and capacitive coupling between driver and pickup coils. This is accomplished, before toroid assembly 59 is immersed in the electrolyte, by first positioning slider 56 at position 65 on resistance 54. Positioning slider 56 at position 65 shorts out bridge circuit 50 from the pickup circuit. The pickup circuit then includes only compensating circuit 30, coil 34 and band pass amplifier 99. After slider 56 has been positioned at 65 the voltmeter 100 should indicate only the value of the residual voltage in coil 34. Sliders 29 and 63 should now be positioned until a zero reading is obtained on voltmeter 100. When a zero reading has been obtained on voltmeter 100 the system is ready to measure the conductivity of an electrolyte and the toroid assembly 59 is immersed in the electrolyte to be tested. Immersing toroid assembly 59 in the electrolyte causes a deflection of voltmeter 100. Slider 56 is now set to a position on resistance 54 such that minimum reading is obtained on voltmeter 100. Resistor 53 is then varied until a further minimum is obtained. This procedure may be repeated to obtain as fine a balance as is desired, but in practice no more than one or two manipulations of resistors 54 and 53 will be required. The position of slider 56 with respect to scale 57 will be an indication of the conductivity of the electrolyte.

In operation the oscillator energizes driver coil 32 which induces a magnetic flux field in toroid 33, said flux inducing a voltage in the electrolyte. The voltage induced in the electrolyte causes an electrical current to flow through the electrolyte within both the driver and pickup toroids. The current flowing through the electrolyte through the pickup toroid 35 induces a magnetic flux field in this toroid. The flux in toroid 35 induces a voltage in coil 34 that is amplified by amplifier 99. Voltmeter 100 connected across amplifier 99 indicates the strength of the voltage induced in the pickup circuit. Connected in series with pickup coil 34 is resistance 54 and slider 56 of the galvanometer circuit of bridge 50. It is noted that a portion of the voltage developed across resistance 54 may be applied to the circuit including pickup coil 34. If this portion of the voltage across resistance 54 were in phase opposition to the voltage induced in the pickup coil, (i. e. the phases of the two voltages differ by 180 degrees), and of sufficient strength, as determined by the setting of slider 56, a null reading would be obtained on voltmeter 100. When a null reading is obtained on voltmeter 100 the position of slider 56 in relation to scale 57 is an indication of the conductivity of the electrolyte.

Figure 8:
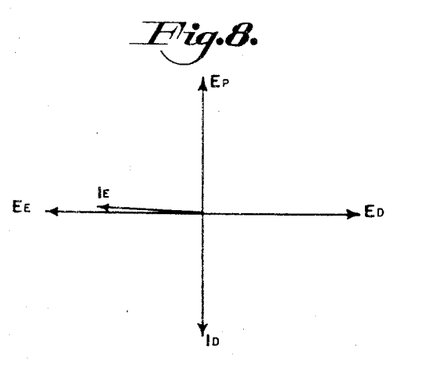
Fig. 8 is a vector diagram of phase relationships of voltages occurring in the driver toroid, electrolyte, and pickup toroid of the invention.
Figure 9:
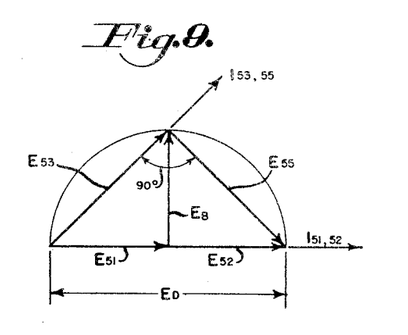
Fig. 9 is a vector diagram of phase relationships of voltages and currents in the nulling circuit of Fig. 2.

Reference is now made to Fig. 8 for a more complete understanding of the phase relationship of the pickup voltage and the voltage applied to the driver coil by the oscillator. The voltage applied to the driver coil by the oscillator is designated $E_d$. The driver toroid has a high Q, and the current in the driver coil, $I_d$ lags $E_d$ by 90 degrees. $I_d$ sets up a flux in the driver toroid core in phase with $I_d$. The flux in the driver toroid induces a voltage $E_e$ in the electrolyte which lags the flux in the driver toroid by 90 degrees and the voltage applied to the driver coil by 180 degrees. As the resistance of the electrolyte is much greater than its reactance a current $I_e$ will flow approximately in phase with $E_e$. However $I_e$ actually differs in phase from $E_e$ by a very small amount since the electrolyte path has some reactance. The current $I_e$ will produce a flux in the pickup toroid that is in phase with $I_e$ and almost in phase with $E_e$. The flux in the pickup toroid induces a voltage $E_p$ in the pickup toroid which lags $I_e$ by 90 degrees. Thus, the voltage $E_p$ in the pickup toroid leads the voltage $E_d$ in the driver toroid by slightly more or less than 90 degrees. It is necessary to introduce a bucking voltage which differs in phase from the voltage applied to the driver coil $E_d$ by slightly more or less than 90 degrees in order to obtain a null reading. The phase shift obtained with circuit 50 to produce the desired bucking voltage is shown by the diagram of Fig. 9. If the current drawn from resistance 54 by the slider 56 for obtaining a null reading is negligible, the current through condenser 55 equals the current through resistance 53. In Fig. 9 $E_{51}$, $E_{52}$, and $E_{53}$ are the voltage drops across resistances 51, 52 and 53 respectively and $E_{55}$ is the voltage drop across condenser 55. If the magnitude of the impedance of resistance 53 equals that of condenser 55 and $I_{53}$ equals $I_{55}$ then $E_{55}$ will equal $E_{53}$. Also the voltage $E_{55}$ across condenser 55, will lag the voltage $E_{53}$ across resistance 53, by 90 degrees.

It should be noted that $E_{51}$ and $E_{52}$ are each equal to $E_d/2$ where $E_d$ represents the voltage applied across both driver toroid 32 and circuit 50. Since the bucking voltage $E_b$ is obtained across resistance 54 connecting the junction of resistances 51 and 52 and the junction of resistance 53 and condenser 54, similarly the vector representing this voltage is shown as vector $E_b$ connecting the junction of vectors $E_{51}$ and $E_{52}$ and the junction of vectors $E_{53}$ and $E_{55}$.

It follows that when $E_{53}$ equals $E_{55}$ the vector $E_b$ representing the bucking voltage will be perpendicular to $E_d$. By reversing the leads of the pickup circuit connecting to bridge circuit 50, $E_b$ could be made either to lead $E_d$ by 90 degrees or lag $E_d$ by 90 degrees. Slight variations of the phase relationship to increase the amount $E_b$ lags $E_d$ can be accomplished by varying resistance 53, or alternatively, capacitor 55 could be varied. Thus, a bucking voltage $E_b$ in phase opposition to $E_p$, the pickup voltage, can be obtained from circuit 50.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. In a system of the character disclosed for measuring the electrical conductivity of an electrolyte, in combination, a driver coil having a magnetic toroidal core for inducing an electric current in the electrolyte, a source of electrical energy comprising an oscillator of constant frequency and amplitude, means electrically connecting the driver coil to said source of energy, a pickup circuit comprising a pickup coil having a magnetic toroidal core constructed and arranged to be energized by said electric current and by the stray magnetic field of the driver coil, means for maintaining said coils in fixed and adjacent coaxial spaced relation, means comprising a bridge circuit and a resistance circuit energized by said source of energy and operatively connected to said pickup coil for applying a voltage to the pickup circuit sufficient to null the voltage induced in said pickup coil by said stray magnetic field, said bridge circuit having means for effecting a phase shift of the voltage therein, said resistance circuit having means for developing a voltage in predetermined phase relation with respect to the voltage of said source of energy, manipulative means connecting said bridge and resistance circuits and adapted to selectively reverse and divide the voltage developed thereacross, means settable at will to different settings for nulling the voltage induced in said pickup coil by said electric current, means for amplifying and metering the voltage in said pickup circuit, and means cooperating with said settable nulling means for indicating the conductivity of said electrolyte when said nulling means has been set to a setting such that a null reading is obtained on said metering means.

2. In a system of the character disclosed for measuring the electrical conductivity of an electrolyte, in combination, a driver coil having a magnetic toroidal core for inducing an electric current in the electrolyte, a source of electrical energy, means electrically connecting the driver coil to said source of energy, a pickup circuit comprising a pickup coil having a magnetic toroidal core constructed and arranged to be energized by the magnetic field of said electric current and by the stray magnetic field of the driver coil, means for maintaining said coils in fixed and adjacent coaxial spaced relation, means comprising a bridge circuit and a resistance circuit energized by said source of energy and operatively connected to said pickup coil for applying a voltage to the pickup circuit sufficient to null the voltage induced in said pickup coil by said stray magnetic field, said bridge circuit having means for effecting a phase shift of the voltage therein, said resistance circuit having means for developing a voltage in predetermined phase relation with respect to the voltage of said source of energy, manipulative means connecting said bridge and resistance circuits and adapted to selectively reverse and divide the voltage developed thereacross, means operatively electrically connected to said pickup circuit for amplifying the voltage therein, and means operatively connected with said amplifying means for indicating the value of the voltage in said pickup circuit as a measure of the conductivity of the electrolyte.

3. In a system of the character disclosed, in combination, means for setting up an alternating magnetic field, a pickup circuit comprising a series arrangement of a pickup coil disposed within said field for generating a voltage therein, means in said pickup circuit for amplifying and indicating the voltage therein, means for nulling said voltage in said pickup circuit comprising a bridge circuit and a resistance circuit, means for energizing said bridge and resistance circuits, means in an arm of said bridge circuit for effecting a phase shift of the voltage therein, a potentiometer having a center tap and connected in the galvanometer circuit of said bridge, first settable means adapted to contact selectively with and divide the voltage across the resistance elements of the potentiometer on either side of said center tap, a second potentiometer having a center tap and connected in said resistance circuit, second settable means adapted to contact selectively with and divide the voltage across the resistance elements on either side of the center tap of said second potentiometer for controlling the strength and direction of a voltage in predetermined phase relation with the voltage of said energizing means, means for electrically connecting said first and second settable means, said pickup circuit being in series connection with said center taps whereby the resultant voltage developed by the voltage injected into the pickup circuit by said resistance and bridge circuits is in phase opposition and equal in magnitude to the voltage generated in said pickup coil.

4. In a system of the character disclosed, in combination, a pickup circuit comprising a series arrangement of means disposed within an alternating magnetic field for generating a voltage therein, means in said pickup circuit for amplifying and indicating the voltage therein, means for nulling said voltage in said pickup circuit comprising a bridge circuit and a resistance circuit, means for energizing said bridge and resistance circuits, means in an arm of said bridge circuit for effecting a phase shift of the voltage therein, a potentiometer having a center tap and connected in the galvanometer circuit of said bridge, first settable means adapted to contact selectively with and divide the voltage across the resistance elements of the potentiometer on either side of said center tap, a second potentiometer having a center tap and connected in said resistance circuit, second settable means adapted to contact selectively with and divide the voltage across the resistance elements on either side of the center tap of said second potentiometer for controlling the strength and direction of a voltage in predetermined phase relation with the voltage of said energizing means, said pickup circuit being in series connection with said center taps whereby the resultant voltage developed by the voltages injected into the pickup circuit by said resistance and bridge circuits is in phase opposition and equal in magnitude to the voltage generated by said voltage generating means.

5. A method of measuring the electrical conductivity of an electrolyte comprising the steps of developing an alternating field of flux within a toroidal path in the electrolyte thereby to cause an electric current to flow in the electrolyte, developing from said electric current a field of flux in a second toroidal path, inducing a voltage in a pickup circuit from the field of flux in said second toroidal path, indicating the voltage in said pickup circuit, applying a bucking voltage to said pickup circuit in phase opposition and of sufficient strength to null the voltage induced from the flux in said second toroidal path, and indicating the conductivity of said electrolyte in accordance with the value of said bucking voltage when the induced voltage has been nulled.

6. A method of measuring the electrical conductivity of an electrolyte comprising the steps of developing an alternating field of flux within a toroidal path in the electrolyte and developing a field of stray flux in the electrolyte encompassing said toroidal path, generating from said stray flux a voltage in a pickup circuit, applying a bucking voltage to the pickup circuit in phase opposition thereto and of sufficient strength to null said first named voltage, inducing by the field of flux within said toroidal path an electric current in the electrolyte, developing from said electric current a field of flux in a second toroidal path, generating a second voltage in a said pickup circuit from the field of flux in said second toroidal path, indicating the value of said second voltage, applying a second bucking voltage to said pickup circuit in phase opposition and of sufficient strength to null said second voltage, and measuring the conductivity of the electrolyte in accordance with the value of said second bucking voltage when said second voltage has been nulled.

7. A method of measuring the electrical conductivity of an electrolyte comprising the steps of developing an alternating field of flux within a toroidal path in the electrolyte and developing a field of stray flux in the electrolyte encompassing said toroidal path, generating from said stray flux a voltage in a pickup circuit, applying a bucking voltage to the pickup circuit in phase opposition thereto and of sufficient strength to null said first named voltage, inducing by the field of flux within said toroidal path an electric current in the electrolyte, developing from said electric current a field of flux in a second toroidal path, generating a second voltage in said pickup circuit from the field of flux in said second toroidal path, and utilizing said second voltage to indicate the conductivity of the electrolyte according to the value of said second voltage.

8. In a system for measuring conductivity of an electrolyte, a source of alternating electrical current, electroresponsive means operatively connected to said current source for setting up an alternating magnetic field within the electrolyte, a pickup circuit, means including a toroidal core composed of magnetic material and having a winding thereon disposed within the electrolyte and responsive to said field for generating a voltage in said pickup circuit, means for injecting a second voltage in the pickup circuit, manipulative means for bringing said first and second voltages into predetermined phase relation with respect to each other, and means for indicating the combined value of said voltages as a measure of conductivity of the electrolyte.

9. In a system for measuring conductivity of an electrolyte, a source of alternating electrical current, electroresponsive means operatively connected to said current source for setting up an alternating magnetic field within the electrolyte, a pickup circuit, toroidal coil means disposed within the electrolyte and responsive to said field for generating a voltage in said pickup circuit, means for injecting a second voltage in the pickup circuit, manipulative means for bringing said first and second voltages into predetermined phase relation with respect to each other, and means for indicating the combined value of said voltages as a measure of conductivity of the electrolyte.

10. In a system for measuring conductivity of an electrolyte, a source of alternating electrical power, electroresponsive means operatively connected to said power source for setting up an alternating current within the electrolyte, a pickup circuit, coil and core means responsive to the alternating field set up by said current for generating a voltage in said pickup circuit, means operatively connected to the pickup circuit for injecting a second voltage therein, manipulative means for bringing said first and second voltages into predetermined phase relation with respect to each other, and means for indicating the combined value of said voltages as a measure of conductivity of the electrolyte.

11. In a system of the character disclosed for measuring conductivity of an electrolyte, means for setting up an alternating current within the electrolyte, a pickup circuit, toroidal core and coil means responsive to the field set up by said current for generating a voltage in said circuit, and means in the pickup circuit for compensating for the inductive effect of the stray field from the current setting up means on said voltage generating means whereby the voltage in the pickup circuit is an absolute measure of said current.

12. In a system of the character disclosed for measuring the electrical conductivity of a conductive medium, in combination, a driver coil having a toroidal core for inducing an electric current in the medium, a source of electrical energy comprising an oscillator of constant frequency and amplitude, means electrically connecting the driver coil to said source of energy, a pickup circuit comprising a pickup coil having a toroidal core constructed and arranged to be energized by the magnetic field of said electric current and incidentally energized by the stray magnetic and electric fields of the driver coil, means for maintaining said coils in fixed and adjacent coaxial spaced relation, means comprising a bridge circuit and a resistance circuit energized by said source of energy and operatively connected to said pickup coil for applying a voltage to the pickup circuit sufficient to null the voltage induced in said pickup coil by said stray fields, said bridge circuit having means for effecting phase shift of the voltage therein, said resistance circuit having means for developing a voltage in predetermined phase relation with respect to the voltage of said bridge circuit, manipulative means connecting said bridge and resistance circuits and adapted to selectively reverse and divide the voltage developed thereacross, means settable at will to different settings for nulling the voltage induced in said pickup coil by the magnetic field of said electric current, means for amplifying and metering the voltage in said pickup circuit, and means cooperating with said settable nulling means for indicating the conductivity of said medium when said nulling means has been set to a setting such that a null reading is obtained on said metering means.

13. In a system of the character disclosed for measuring the electrical conductivity of a conductive medium, in combination, a driver coil having a toroidal core for inducing an electric current in the medium, a source of electrical energy, means electrically connecting the driver coil to said source of energy, a pickup circuit comprising a pickup coil having a toroidal core constructed and arranged to be energized by the magnetic field caused by said electric current and incidentally energized by the stray magnetic and electric fields of the driver coil, means for maintaining said coils in fixed and adjacent coaxial spaced relation, means comprising a bridge circuit and a resistance circuit energized by said source of energy and operatively connected to said pickup coil for applying a voltage to the pickup circuit sufficient to null the voltage induced in said pickup coil by said stray fields, said bridge circuit having means for effecting a phase shift of the voltage therein, said resistance circuit having means for developing a voltage in predetermined phase relation with respect to the voltage of said bridge circuit, manipulative means connecting said bridge and resistance circuits and adapted to selectively reverse and divide the voltage developed thereacross, means operatively electrically connected to said pickup circuit for amplifying the voltage therein, and means operatively connected with said amplying means for indicating the value of the voltage in said pickup circuit as a measure of the conductivity of the electrolyte.

14. In a system of the character disclosed for indicating the electrical conductivity of an electrolyte, the combination of a source of alternating current, a driver coil energized from said source and having a magnetic toroidal core for inducing an electric current in the electrolyte, a pickup circuit comprising a pickup coil having a magnetic toroidal core constructed and arranged to be energized by the magnetic field set up by said electric current and incidentally by the stray magnetic field of the driving coil, means energized by said source and operatively connected to said pickup circuit for injecting a voltage therein sufficient to null the voltage induced in the pickup coil by said stray magnetic field, and means operatively connected to the pickup circuit for indicating the conductivity of the electrolyte according to the magnitude of the voltage induced in the pickup circuit by said magnetic field set up by said electric current.

15. In a system for indicating the conductivity of an electrolyte, the combination of means for setting up an alternating current within the electrolyte, a pickup circuit, toroidal core and coil means responsive to the alternating magnetic field set up by said current for inducing a voltage in said pickup circuit, and means operatively electrically connected to said pickup circuit for indicating the conductivity of the electrolyte according to the magnitude of said induced voltage.

MATTHEW J. RELIS.

REFERENCES CITED

The following references are of record in the file of this patent:

UNITED STATES PATENTS

| Number | Name | Date |
|---|---|---|
| 1,610,971 | Ruben | Dec. 14, 1926 |
| 1,793,970 | Simon et al. | Feb. 24, 1931 |
| 1,919,284 | Walter | July 25, 1933 |
| 1,983,442 | Drake | Dec. 4, 1934 |
| 2,057,835 | Karajan et al. | Oct. 20, 1936 |
| 2,435,043 | Lehde et al. | Jan. 27, 1948 |
| 2,502,626 | Mages | Apr. 4, 1950 |